US008429305B2

(12) United States Patent
Tremaine et al.

(10) Patent No.: US 8,429,305 B2
(45) Date of Patent: Apr. 23, 2013

(54) METHOD FOR EFFICIENTLY GENERATING PRIVACY ADDRESSES

(75) Inventors: Michael Tremaine, San Diego, CA (US); Marcello Lioy, San Diego, CA (US); Uppinder S. Babbar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 911 days.

(21) Appl. No.: 11/859,766

(22) Filed: Sep. 22, 2007

(65) Prior Publication Data
US 2008/0075083 A1 Mar. 27, 2008

Related U.S. Application Data

(60) Provisional application No. 60/826,895, filed on Sep. 25, 2006.

(51) Int. Cl.
*G06F 15/16* (2006.01)
(52) U.S. Cl.
USPC .......................................................... 709/250
(58) Field of Classification Search ................... 709/250
See application file for complete search history.

(56) References Cited

U.S. PATENT DOCUMENTS

| 6,925,087 | B2* | 8/2005 | Inoue | 370/401 |
|---|---|---|---|---|
| 7,051,087 | B1 | 5/2006 | Bahl et al. | |
| 2002/0031135 | A1* | 3/2002 | Inoue | 370/401 |
| 2003/0026230 | A1* | 2/2003 | Ibanez et al. | 370/338 |
| 2003/0120766 | A1* | 6/2003 | Ishiyama et al. | 709/223 |
| 2003/0204683 | A1* | 10/2003 | Okumoto et al. | 711/147 |
| 2003/0217145 | A1* | 11/2003 | Leung et al. | 709/224 |
| 2004/0037242 | A1* | 2/2004 | Shi et al. | 370/329 |
| 2005/0041671 | A1* | 2/2005 | Ikeda et al. | 370/395.52 |
| 2005/0160136 | A1* | 7/2005 | Takahashi | 709/200 |
| 2005/0163123 | A1* | 7/2005 | Gangadharan | 370/392 |

FOREIGN PATENT DOCUMENTS

| JP | 10320323 A | 12/1998 |
|---|---|---|
| JP | 11055317 | 2/1999 |
| JP | 2006020262 A | 1/2006 |

OTHER PUBLICATIONS

Han et al. "Advance Duplicate Address Detection." pp. 1-16. Jul. 2003. Submitted by the applicant to the Office on Jan. 5, 2009.*
Narten et al. "RFC 3041—Privacy Extentions for Stateless Address Autoconfiguration in IPv6." [Retrieved online on Nov. 4, 2010] Jan. 2001. <URL: http://www.ietf.org/rfc/rfc3041.txt>.*
Thomson et al. "RFC 2462—IPv6 Stateless Address Autoconfiguration." [Retrieved online on Nov. 4, 2010] Dec. 1998. <URL: http://www.ietf.org/rfc/rfc2462.txt>.*
Written Opinion—PCT/US07/079339, International Search Authority—European Patent Office—May 26, 2008.
International Search Report—PCT/US07/079339, International Search Authority—European Patent Office—May 26, 2008.
Han, Y. et al.: "Advance Duplicate Address Detection," draft-han-mobileip-adad-01.txt; IETF Standard-Working-Draft, Internet Engineering Task Force, IETF, CH, No. 1, Jul. 1, 2003, XP015001112.
Narton and Draves, Standards Track, RFC 3041 Privacy Extensions for Stateless Address Autoconfiguration in IPv6. Jan. 2001.
Taiwan Search Report—TW096135798—TIPO—Sep. 17, 2011.

\* cited by examiner

*Primary Examiner* — Larry Donaghue
(74) *Attorney, Agent, or Firm* — James T. Hagler

(57) ABSTRACT

A method for generating privacy IP address includes pregenerating a first privacy address and generating a second privacy address when the first privacy address is allocated to an application. Addresses may be shared by applications or unique to a single application. A deprecation timer is started when an application binds to an allocated privacy address, now when the privacy address is generated. To minimize traffic flow disruptions a deprecated address is not deleted while the address remains in use. By pregenerating privacy addresses, an address can be promptly allocated to an application without delays incurred by confirming that a new address is not a duplicate on the system. The method can be implicated on any device using privacy addresses, including mobile handset devices.

20 Claims, 10 Drawing Sheets

METHOD FOR EFFICIENTLY GENERATING PRIVACY ADDRESSES

CLAIM OF PRIORITY UNDER 35 U.S.C. §119

The present application for patent claims priority to Provisional Application No. 60/826,895 entitled "METHOD OF EFFICIENTLY GENERATING PRIVACY ADDRESSES" filed Sep. 25, 2006, and hereby expressly incorporated by reference herein in its entirety.

FIELD OF THE INVENTION

The present invention relates generally to network communications, and more specifically to techniques for generating IPv6 privacy addresses.

BACKGROUND

In an Internet Protocol (IP) network, a host communicates with another host via a router. As used herein, "IP" generically refers to all versions of the Internet Protocol. In IP terminology, a "node" is a device that implements IP, a "router" is a node that forwards IP packets not explicitly addressed to itself, and a "host" is a node that is not a router. A host may have one or multiple interfaces to a link. In IP terminology, a "link" is a communication facility or medium over which nodes can communicate at a link layer (which is the layer immediately below the IP layer), and an "interface" is a node's attachment to a link. An interface may be viewed as a network communication port. Each interface is associated with one or more IP addresses that uniquely identify that interface.

Internet Protocol Version 6 (IPv6) is a version of Internet Protocol that is slated to replace the widely used Internet Protocol Version 4 (IPv4). IPv6 resolves some of the key limitations of IPv4. For example, IPv4 utilizes a 32-bit address that was originally thought to provide an ample number of addresses to uniquely identify machines connected to the Internet. However, the explosive growth of the Internet has created a real risk of running out of IPv4 addresses. IPv6 ameliorates this concern by utilizing a 128-bit address.

IPv6 also provides other improvements over IPv4. For example, IPv6 supports "stateless address autoconfiguration," which is a process whereby a host can automatically configure its own IPv6 address(es). Stateless address configuration can avoid the need to manually configure each host before its connection to a network, eliminate the need for a dedicated server to administer and assign addresses to hosts on the network, and facilitate renumbering of addresses for hosts on the network.

The stateless address configuration in IPv6 allows for nodes to generate "privacy addresses" as defined in RFC 3041—Privacy Extensions for Stateless Address Autoconfiguration in IPv6. This allows nodes to hide their movement within the IPv6 Internet by periodically changing their IP address. This is accomplished by generating a random Interface ID ("IID") and associating it with the network prefix of the current access router. When a node is on a broadcast network it is necessary to validate that there is no other node using the newly generated IID. As used herein, "broadcast network" refers to a network connected to a broadcast media, such as 802.3. The process of validating that no other node is using a privacy address on a broadcast node is called Duplicate Address Detection (DAD). The process of generating and validating IIDs takes time, and nodes requesting privacy addresses are required to wait until the address is generated, validated, and finally assigned before the node can use the address. The latency introduced by this process is undesirable. What is needed is an efficient system for generating and managing IPv6 privacy addresses when on a broadcast network.

SUMMARY

Various embodiments resolve latency issues associated with generating privacy addresses by generating at least one extra private IID or address that is validated and stored for use as soon as requested by an application. Another private IID or address can be generated whenever an application or node is assigned a private address. Deprecation timers for private addresses may be started only when an application binds to the address.

Various embodiments provide for unique addresses which are only assigned to a single application and are not capable of being bound by more than one application, as well as shared addresses which can be allocated to any number of applications requesting a shared address. The embodiments minimize traffic flow disruptions by not deleting a deprecated address while the address is in use.

Methods for generating privacy addresses may be implemented on any computing device, including in particular mobile handsets.

BRIEF DESCRIPTION OF THE DRAWINGS

The features and nature of the present invention will become more apparent from the detailed description set forth below when taken in conjunction with the drawings in which like reference characters identify correspondingly throughout and wherein.

DETAILED DESCRIPTION

Figure 1:
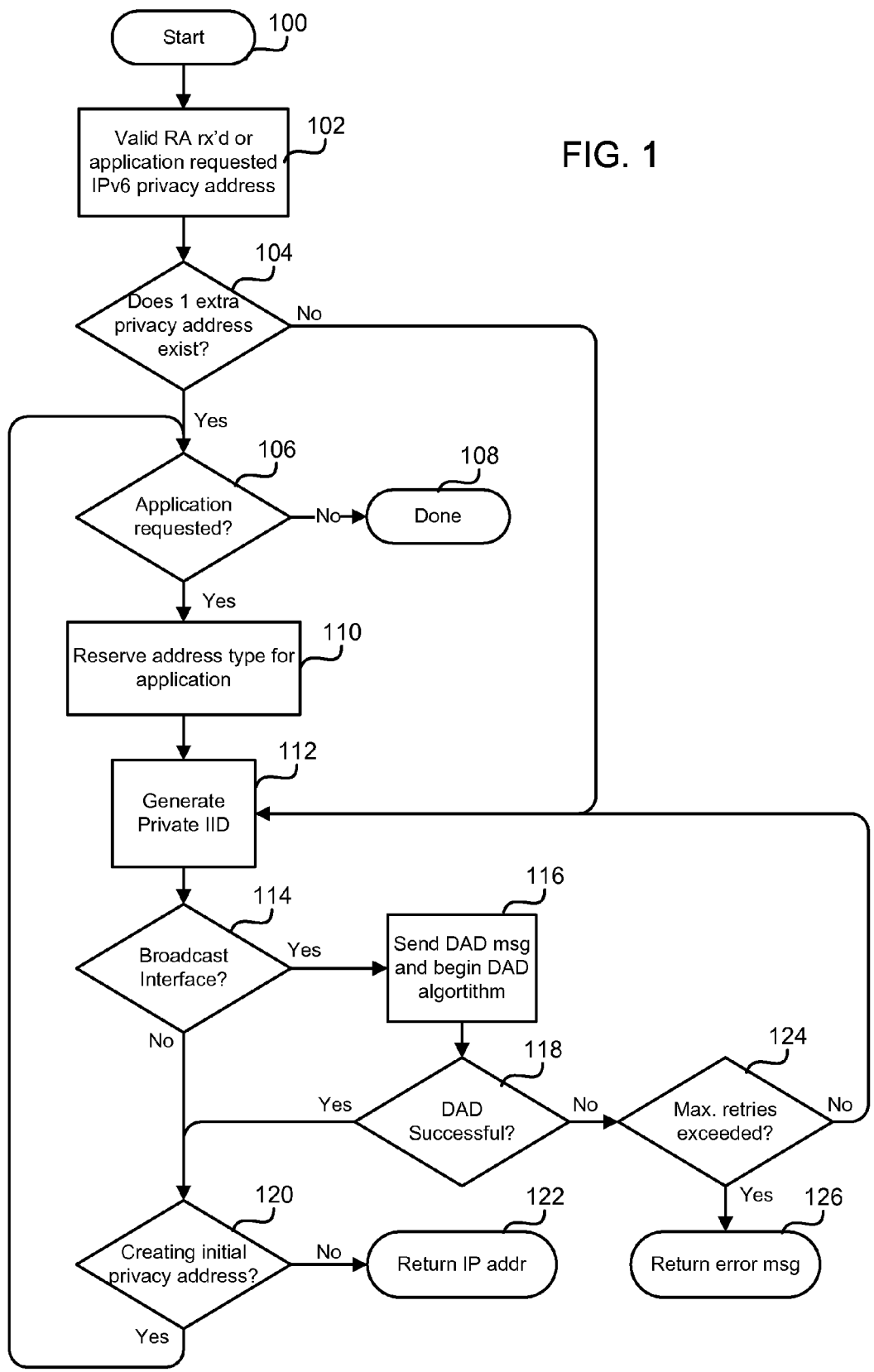
FIG. 1 is a process flow diagram providing an overview of the various embodiments for generating and assigning private addresses to applications.

The various embodiments will be described in detail with reference to the accompanying drawings. Wherever possible, the same reference numbers will be used throughout the drawings to refer to the same or like parts.

As described in RFC-3041—Privacy Extensions for Stateless Address Autoconfiguration in IPv6, which is hereby incorporated by reference in its entirety, some Internet users may have privacy concerns regarding the potential that IP addresses can be monitored by eavesdroppers and data miners. By tracking IP addresses used by a particular interface (e.g., cellular telephones, laptop computers, personal data assistants (PDAs) and mobile electronic mail receivers), it may be possible for data miners to track the movements and Internet communications of users even if the communications are themselves encrypted. These concerns can be resolved by using IP addresses that are generated in a random manner and changed periodically, thereby complicating the problem of tracking IP addresses to particular nodes (e.g., user mobile handsets or laptops).

Cellular mobile handsets (e.g., multifunction cellular telephones) employ private IP addresses to establish and manage connections to cellular telephone nodes as well for data link connections to electronic mail and Internet connection services. When a call is placed and with each cellular node hand off, a new IP address can be used for the mobile handset. Similarly, when an electronic mail message is to be transmitted or access to the Internet via wireless data links is requested, an IP address is generated by or assigned to the mobile handset. Under IPv6, the IP addresses can be made private so that data mining tools cannot easily track the locations and phone usage of individuals.

As described above, an IPv6 IP address is 128 bits long, comprising a 64-bit prefix and 64-bit IID. In most situations the prefix is either fixed or provided by the router to which the device is connecting. Thus, to generate a private IP address, a system need only generate a random and non-redundant IID that is combined with a known prefix. The generation of the IP address by making this combination of an IID with the prefix is generally be accomplished by the system (although the various embodiments would also be useful in an implementation in which an application generates an address upon receiving an IID).

In various embodiments the system may generate a new address by combining pre-verified IID with the prefix when an application requests an IP address (i.e., just before the address is allocated to the application). Alternatively, the system may generate the address at the time an IID is generated and verified (for broadcast addresses), with the address stored in memory or a buffer until requested by an application. In other words, in various implementations or embodiments, a prefix can be combined with private IID at any time after the generation of the 64-bit random number. Thus, system embodiments can manage IIDs or addresses according to the methods described herein. For this reason, references herein to "IP address," "address" and "IID" may be interchangeable, depending upon the context, as would be understood by one of skill in the art. Further, references to an "address" are not intended to exclude an IID or refer only to the combination of a prefix with an IID in contexts where the system could be generating or storing an IID. Similarly, references to "IID" are not intended to necessarily exclude an address (i.e., the combination of the IID with a prefix) in contexts where the system could be generating, storing or allocating an address. Also, the combination of the prefix with the IID to form an IP address is not shown in the figures so as to avoid implying that the full IP address is generated at a particular point in the embodiment processes.

Procedures described in RFC3041 generate private addresses by generating a 64-bit random number according to an algorithm designed to ensure a high degree of randomness. The 64-bit random number is used as a temporary IID, which is combined with the prefix address of the router or node to which the device is connected in order to create a private IP address. In order to defeat eavesdroppers and data miners, addresses based on the temporary IIDs described in RFC3041 are limited to a valid lifetime (e.g., one week) and a shorter preferred lifetime (e.g., one day). As envisioned in RFC3041, when the valid lifetime, measured by a valid lifetime timer, expires, an address should no longer be used and should be deleted by the system. When the preferred lifetime, measured by a preferred lifetime timer, expires, the address is referred to as "deprecated" and should not be assigned to an application and applications using a deprecated address should request a new private address. Since an address is deprecated when its preferred lifetime timer expires, the preferred lifetime timer is referred to generally herein as a "deprecation timer." RFC3041 calls for starting the valid and deprecation timers when a new IID is created or when an address based on the new IID is generated. Devices connected to a broadcast network, i.e., a network connected to a broadcast media, such as 802.3, must have a unique IP address in order for the network to know the source and destination of packets. Therefore, IIDs generated for use in a broadcast context are validated using the DAD process which confirms that no other node on a broadcast network is using the same IID. Since the DAD process takes time to complete, RFC3041 calls for generating a new IID a short time (e.g., 5 seconds) before the current IID preferred lifetime expires.

While the procedures specified in RFC3041 may be satisfactory for many fixed and mobile computer applications, the procedures have limitations which can impact a user's experience, particularly in the context of cellular telephone type mobile handsets. Since users typically keep their mobile handsets with them at all times, privacy concerns are increased. If an address used in a mobile handset has a lifetime as contemplated in RFC3041 (i.e., one day to one weekly), a data miner could track the location and network usage of a user for a whole day or week. Thus, the IID-based address lifetimes contemplated in the RFC3041 procedures will not provide sufficient anonymity for many mobile handset users. Mobile handsets can use a new address based on a new IID with each call, and potentially with each cell node handover. Since phone and data calls from a mobile handset can be short or long and be established at any time, there is a need for methods for generating private addresses on a frequent and unpredictable basis not contemplated in RFC 3041.

Modern mobile handsets can have a large number of applications running at the same time and employ a number of interfaces. Thus, mobile handsets may require a number of addresses, and thus a number of IIDs. Some applications may be able to share an IID-based address, but some applications, such as cellular telephony and wireless Internet communications, require a dedicated and globally unique IP address. However, RFC 3041 contemplates generating only a single IP address for a device. Thus, there is a need for methods for generating and allocating multiple addresses to multiple interfaces and applications.

In the normal operation of mobile handsets, there are a variety of uniquely varying values associated with signal strength and characteristics which provide more random seed values for generating random numbers for IIDs than the procedure specified in RFC 3041. Thus, mobile handsets may use a different algorithm involving fewer steps or memory while providing a higher level of randomness.

In mobile applications, the IID is a 64-bit random number that is combined with the 64-bit network prefix of the connected broadcast network router to create a 128 bit IPv6 address. Thus, to ensure a unique IP address, the DAD (duplicate address detection) routine is performed to confirm that no other device connected to the communication node or router is using the same IID or address. The DAD process typically involves broadcasting the proposed address and asking if other devices are already using the address. However, this process takes time to complete, which can result in user experience issues, such as delay in establishing a call, sending an e-mail or receiving Internet content.

To overcome these limitations the various embodiments provide improved methods for generating, allocating and controlling private addresses. These improvements include generating and confirming IIDs or addresses before an address is requested by an application so that a pre-verified IID or address is readily available in most conditions. To enable this capability, an IID or address may be generated and stored in memory or buffer when a device, such as a mobile handset, is initialized or a data session is established for a particular interface (e.g., upon receiving a router advertisement). Then whenever an application requests and is allocated an address a replacement IID is promptly generated which may be stored or in some embodiments used to create an address that is stored. Since IIDs are generated and verified in advance, deprecation timers associated with particular IIDs or addresses are not started until the requesting application actually binds the address. This ensures that IIDs or addresses stored in a memory or buffer do not expire before they are used and enables use of short IID or address lifetimes. Additionally, the various embodiments provide addresses that can be shared by multiple applications and addresses that are unique to a particular application.

In allocating IP addresses, an embodiment system can keep track of whether the requesting application binds to the address. For example, the system may include a timer that is started when an address is allocated to an application and counts down to a preset time, such as two minutes, or until the application binds the address to a socket. If the requesting application does not bind the allocated address within the preset time (e.g., two minutes), it can be presumed that the application is not using the address, and the address may be deleted and the application informed that the address is no longer valid. This capability prevents applications from consuming resources unnecessarily.

The embodiment system may also track assigned addresses (or IIDs) by counting the number of applications that have bound to each address using what is referred to herein as reference counts ("Ref_cnt"). If one application binds to an address the reference count for that address is one. If two applications share an address and both bind to that address the reference count is two. If an application unbinds from an address the reference count is reduced by one. If an application unbinds a unique address, the reference count is decremented to zero, which indicates to the system that the address should be deleted. Similarly, reference counts are used to determine when a deprecated shared address can be deleted. Specifically, a deprecated address is not deleted until the reference count equals zero. Thus, the system will not allocate a shared address to an application once its deprecation timer has expired, but it will not delete the deprecated address until its reference count equals zero indicating that no application is presently using the address. A significant advantage of this method is that it minimizes traffic flow disruptions by not deleting a deprecated address while the address is in use. Reference counts can also be used by the system to determine if system resources can be freed up.

FIG. 1 illustrates an overview method of various embodiments. The embodiment methods may be implemented as a subroutine, application program interface or support application within an operating system, run time environment, or application development toolkit. The method may be activated, step 100, such as when a valid router advertisement (RA) is received or when an application requests an IPv6 privacy address, step 102. The implementing software may first check to determine if an extra IID or privacy address is stored in memory, test 104. If there is an extra IID or address in memory, the type of request may be tested to determine if an application is not requesting the address, test 106, in which case the routine ends, step 108. If an application has not initiated the IID generation process, this means that the process was generated autonomously by a router advertisement, in the which the process need not do anything further so as long as there is one extra address stored in memory. If the request is from an application (i.e., test 106="Yes"), then the type of address required for the application (unique or shared) is reserved, step 110. An IID is then generated, such as by generating a 64-bit random number using various random numbers stored in memory (e.g., link management related values) as seed values, step 112. If the interface for which the address is being generated will be a broadcast interface (i.e., an interface connected to a broadcast media, such as 802.3), test 114, the DAD routine will be initiated, step 116. As part of this routine, the application may be informed that an address will be provided when it has been confirmed.

In the DAD process 116 the proposed IID (or the address itself) is broadcast to other nodes on the network to determine if other devices are using the same IID value or address. The result of this process will be a value indicating whether DAD was successful (i.e., the process determined that no other device is using the IID or address) or not (i.e., the process determined that the proposed IID is a duplicate). If the DAD process is not successful, test 118, then the routine may test whether a predetermined number of retries at generating an IID has been exceeded, test 124. This test is provided to detect error conditions that could preclude obtaining a nonredundant IID within a reasonable time. If the predetermined number of retries is exceeded, an error message may be provided to the application and the routine ended, step 126. If the predetermined number of retries has not been exceeded, then another IID is generated, step 112, and the process continued as described above until an IID successfully completes the DAD process.

If the IID or address is not intended for a broadcast interface (i.e., test 114="No") or if the DAD process is successful (i.e., test 118="Yes"), then the process may test whether an initial IID or address is being generated, test 120, which may occur if there is no extra IID or address available. If the process is not creating an initial privacy address, then the IID is returned, stored in memory or combined with a prefix to form an address that is allocated to an application, and the routine ended, step 122. If the routine is creating an initial privacy address (i.e., test 120="Yes"), then the process is repeated beginning at test 106 to generate a second IID. This second IID can then be stored in memory or a buffer (or used to create an address that is stored in memory or a buffer) for use in response to the next request for an address.

Returning to test 104, if an extra privacy address is not present in memory (i.e., test 104="No"), the process may procedure directly to generating an IID, step 112. In this situation the test of creating an initial privacy address, test 120, will be "Yes" and the routine will be repeated before an address is allocated to an application. This process ensures that an extra privacy address will be retained in memory or a buffer for use in response to the next request for an address.

In order to permit IIDs or addresses to be generated in advance, changes to the activation of address deprecation timers is required. Under the methods envisioned in RFC 3041, preferred deprecation timers are started on the creation of an IID or when an address is generated using the IID. Thus, if an IID or address is generated in advance of an application request, the address could expire or deprecate shortly before or after being assigned to an application. To prevent this from happening with pre-generated IIDs or addresses, the various embodiments do not start a preferred deprecation timer until the application binds the address to a socket (i.e. an application begins using it). This allows for the pre-generation of IIDs and addresses that will have sufficient preferred lifetime remaining when they are assigned to an application.

In a preferred embodiment, the system only acts on the preferred lifetime deprecation timer by informing applications that the address is deprecated. The valid lifetime timer runs but the system does not take action to delete an address when its valid lifetime timer expires since this could cause undesirable interruption of key applications, such as Voice over IP (VOIP) and real-time applications. In the case of shared private IIDs, the preferred deprecation timer dictates the period in which new applications can be assigned a particular shared IID. Once the preferred timer has expired, the address is said to be deprecated and a new application request will trigger the allocation of a new shared private IID based address. Also, applications using a deprecated shared address will be informed so that the address can request a new address.

Additionally, the various embodiments provide for unique and shared addresses. This innovation recognizes the fact that many applications can readily share addresses without conflict, while some applications, such as cellular telecommunications and wireless Internet communications, cannot share addresses.

Shared addresses can be used by multiple applications without conflict. The deprecation timers envisioned in RFC 3041 may be used to ensure that a shared address is not used so long as to present a privacy concern. Shared addresses are controlled by the system with their lifetimes determined by deprecation timers.

Unique addresses are assigned to only a single application and as soon as that application releases the address the IID and address are deleted so that the address is only used once. This provides applications that use unique IIDs with the highest privacy protections. The application that requests and receives a unique address can allocate the address to other applications without involvement by the system, giving applications increased control over network data connections. Since only a single application uses a given IID and only one time, notifying applications of expiration of deprecation timers is optional with unique address. If notified, the application using the address is only informed of the expiration of the timer and the address is not deleted; termination of the use of an address is left to the application.

Figure 2:
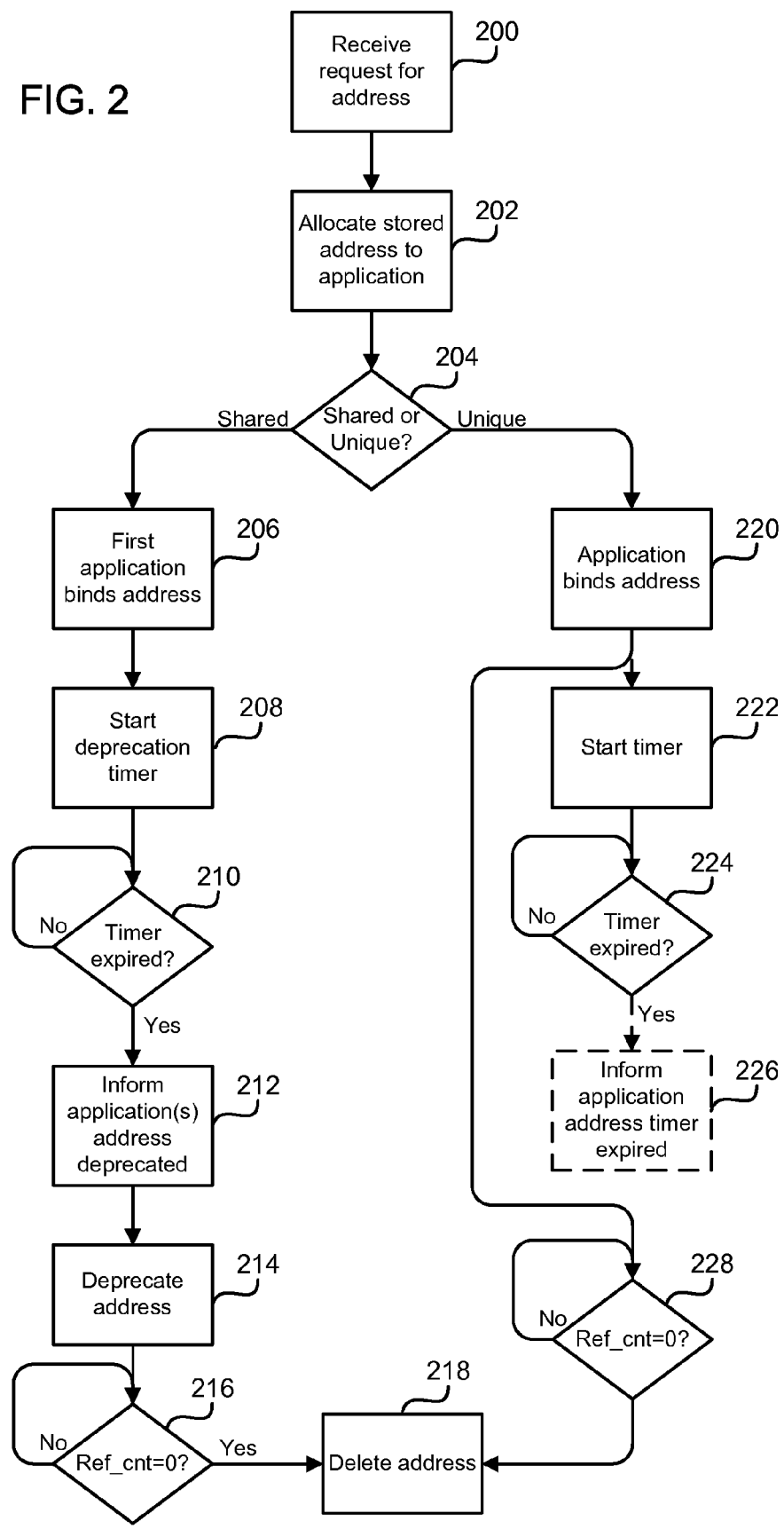
FIG. 2 is a process flow diagram providing an overview of initiation of deprecation timers for private addresses according to an embodiment.

The assignment of IID-based addresses to applications and the use of deprecation timers are illustrated in FIG. 2. When a request for an address is received from an application, step 200, an address is generated using the IID in memory or an address is recalled from memory, and allocated to the application as described in further detail below, step 202. Handling of the address then depends upon whether the address is to be shared or unique, test 204. If the address is to be shared, it is allocated to the requesting application which binds the address (the address being the prefix plus the IID), step 206. At this point the deprecation timer is started for the shared address, step 208. Subsequent requests for a shared address from other applications can be satisfied with the same shared address as used by the first application with no need to start a new deprecation timer.

Once started, the deprecation timer continues until it expires, test 210. At that point, applications using the address are informed that the address is deprecated, step 212, and the address is deprecated, step 214, so that it cannot be assigned to another application. When each application releases an address, the address's reference count ("Ref_cnt") is decremented. The process monitors the reference count of deprecated addresses, test 216, and when the count equals zero, meaning the address has been released by all applications, the deprecated address is deleted, step 218.

If the request is for a unique address, the IID in memory is combined with the prefix to generate a unique address that is allocated to only one application, which binds the address, step 220. In embodiments in which the address is formed in advance from the IID and stored in memory, the address in memory is allocated to one application which binds the address in step 220. The unique address will remain valid and in use until the application releases the address which decrements the reference count ("Ref_cnt") to zero. The process monitors the reference count, and when the reference count equals zero, test 228, the IID and address are deleted, step 218, so that it cannot be used again. A deprecation timer is started when the application binds the address, step 222, and the deprecation timer runs until it expires, step 224. Optionally, the process may inform the application that the address deprecation timer has expired, step 226 (shown in dashed line since the step is not implemented in some embodiments). However, the address will not be deprecated based on expiration of the deprecation timer in order to preclude interrupting functions of the application. The application may include provisions to request a new address when notified that a preferred lifetime timer has expired, or may be programmed to ignore such notifications.

Figure 3:
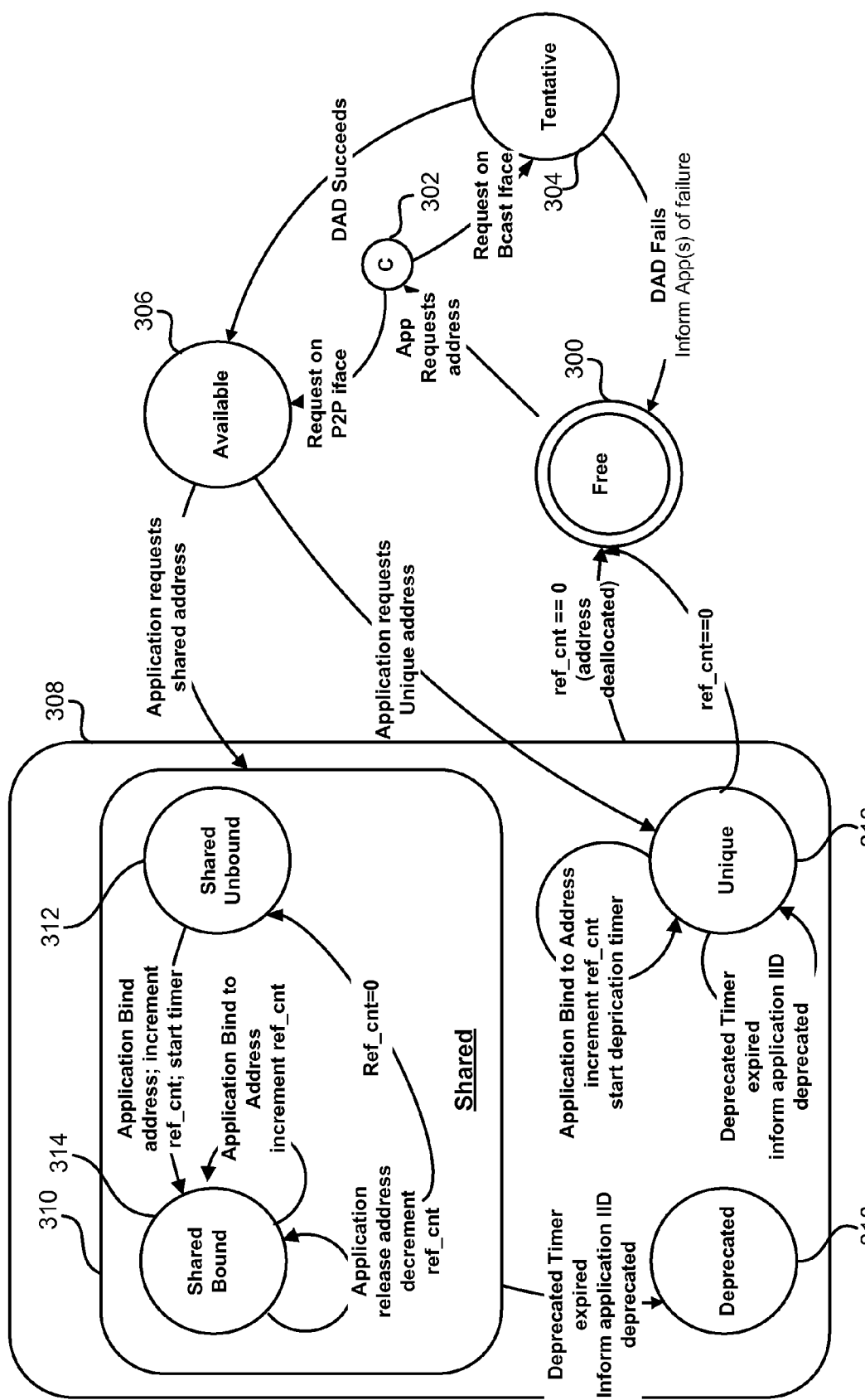
FIG. 3 is a state machine diagram that illustrates possible states of various IIDs during operation of a device implementing one of the various embodiments.

The overall functioning of the various embodiments is illustrated in FIG. 3 which shows an IID state machine illustrating the various states that a system can have during operations with respect to IIDs and privacy addresses. The state machine begins at state Free 300 in which there are no private IIDs or addresses assigned or stored in memory or a buffer. This state may be reached upon activation of the device before IIDs have been generated, or after a period of time out of contact with a network during which time IIDs could not be generated. From this state, a private IID is generated as described below with reference to FIG. 4. An application running on the device may request a private address for connecting to a network. Upon receiving this request, the device generates an IID, proceeding in the state machine to state C 302.

From the C state 302, if the request is on a point-to-point network or a non-broadcast network, i.e., from an application 308 that can share addresses, the generated IID is ready for use and the state machine proceeds to the Available state 306. This is the state in which a private IID is available to create an address for assignment to the requesting application 308. In some embodiments the Available state 306 may indicate that a private address has been created from the IID and is available for assignment to the requesting application 308. A point-to-point network is one in which the prefix is unique per connection.

If the prefix is shared on other point-to-point links from a router or if the address request is made on a broadcast network that is not a point-to-point network, the device initiates the DAD process and the state machine proceeds to the Tentative state 304. In the Tentative state 304, the network runs the DAD process described to ensure the IID is not a duplicate of an address already in use by another node. This IID state is tentative to account for the delay in verifying the IID while the DAD process proceeds. If the DAD process fails, indicating that a duplicate IID was generated, the state machine returns to the Free state 300 and then to the C state 302 as a new IID can be created. The application 308 requesting the IID may be informed of the failure since the time to generate another IID and complete the DAD process for the new IID will delay assignment of an address to the application 308. In the case of multiple requests for shared addresses, all applications 308 requesting the shared address need to be informed if the request fails. If the DAD process succeeds, indicating that the IID is not redundant on the broadcast node, the state machine proceeds from the Tentative state 304 to the Available state 306, indicating that a verified broadcast IID is ready to be used to generate an address that can be assigned.

From the Available state 306, the device determines whether the application 308 requested a shared address or a unique address. If the application 308 requested a shared address the state machine proceeds to the Shared state 310. Either an address is created by combining the available IID with a prefix, or the available address is recalled from memory. In the Shared state 310, the application 308 is assigned an address that may be shared with other applications. Within the Shared state 310, an address is initially in the Shared Unbound state 312 in which it is allocated to one or more applications. When an application 308 binds to the assigned address, the state machine proceeds to the Shared Bound state 314. Upon binding, a reference counter ("ref_cnt") is incremented to keep track of the number of applications bound to the address. Other applications can also bind to the shared address. Each time another application binds to the shared address, the reference count is increment. At any time an application 308 can release the address (i.e., unbind and stop using the address), at which point the reference count is decremented. If after an application 308 releases the shared address the reference count equals zero, indicating that no application is currently bound to the address, the shared address returns to the unbound state 312, unless the address is deprecated as described below.

As discussed above, shared private IID-based addresses have a preferred lifetime period associated with them to ensure that no application uses one of these addresses indefinitely. When the first application binds to the shared address, changing the IID/address state from Shared Unbound 312 to Shared Bound 314, a deprecation timer associated with the IID-based address is started. The deprecation timer is used to determine the time remaining in the preferred lifetime of an address. (A valid timer is also started but, as described herein, the valid timer is not used by the system and addresses are not deleted based upon expiration of the valid timer.) Once the deprecation timer for an address expires, the address is deprecated and subsequent application shared address requests will be satisfied with a different private shared address. In an embodiment, the preferred deprecation timer is used to indicate whether an address can be assigned to an application, and when applications using an address should be informed that an address has deprecated and that a new address should be requested. While an IID-based address is in the Shared Bound state 314 other applications can bind to the same address and thus share it so long as its deprecation timer has not expired.

The deprecation timer counts down the remaining preferred lifetime period for an IID-based address until it expires, at which point the address changes to the Deprecated state 318. At this point the applications using the shared IID-based address may be notified that the address is deprecated so the applications can, if they are so programmed, request a new address. Once all applications using the deprecated shared address release the address, its reference count ("Ref_cnt") equals zero, at which point the address is deleted and the system moves to the Free state 300 so the process of generating a new IID and allocating addresses can continue.

Returning to the Available state 306, if the application 308 requested a unique address, an IID-based address is allocated solely to the requesting application 308 and the state machine proceeds to the Unique state 316. In the Unique state 316, the application 308 is bound to the unique address and that address is controlled by the application. Once a unique address is assigned to an application 308, the system can no longer assign that address to any other application. However, the original application 308 that is assigned the unique address may allow other applications or processes to bind to the unique address. Thus, in the Unique state 316 control of the unique address is passed to the requesting application. Although deprecation timers are started upon assignment of the unique address to the application, any notification to the application of expiration of this timer is optional for a unique address. Because only a single application uses the unique address, there is no need for the system to prompt the application 308 to release the address until the application has stopped using the address. If a deprecation timer is used and expires, the application may be informed of this fact, but the address is not deprecated by the system. However, as described herein, as soon as an application 308 releases a unique address, which decrements its reference count to zero, the released unique address is deleted by the system.

In order to speed the operation of applications it is desirable to ensure that an IID or address is always available when an application requests an address. This may be done by generating a private IID at session establishment, and automatically generating another private IID when an application makes a request. This speeds up returning a private address to applications because there is always an extra IID (or address) in reserve. This is important for broadcast interfaces, as may be employed on mobile handsets, since DAD takes some time to complete which can cause undesirable delays in establishing or continuing communications. Using these methods, a pre-verified address can be available at all times, ready to support an application address request, even when addresses expire or are deleted unpredictably. Methods for generating and assigning private IIDs are described below with references to FIGS. 4-9.

Figure 4:
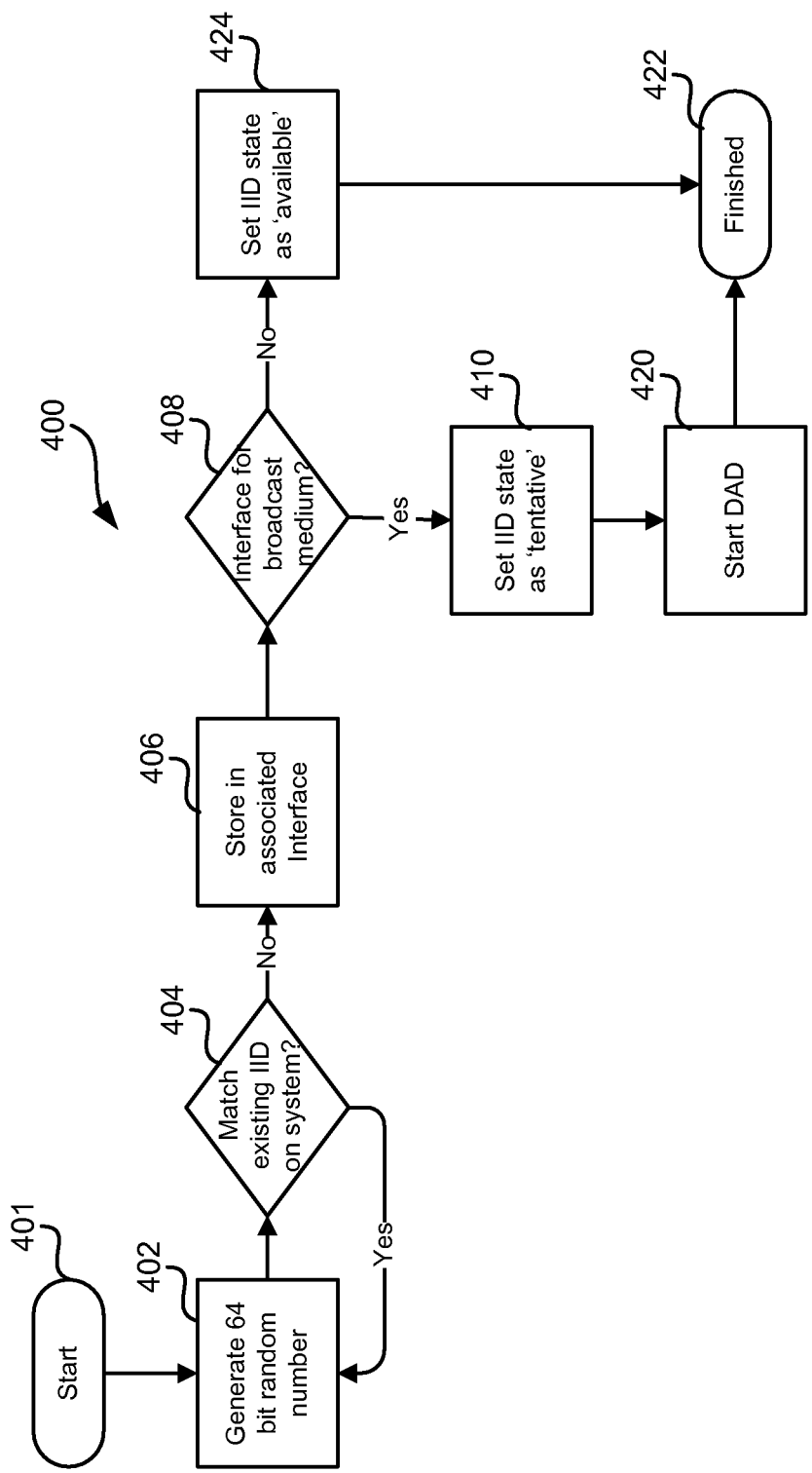
FIG. 4 is a process flow diagram of an embodiment method for generating an IID.

FIG. 4 illustrates an example embodiment of an IID generation process 400. When an application requests an address or the system receives a router advertisement, the IID generation process may be initiated, step 401. The process generates a 64-bit random number to be used as a temporary IID, step 402. Any known random number generator algorithm may be used to generate this number, and in the case of a mobile handset, a variety of link control data may be used as random seed values for the algorithm since link control data varies rapidly and is most likely different in every mobile handset at any given instant. Since the IID is generated randomly, it may be tested against IIDs already employed by the device or stored in the system to confirm that the new IID is not a duplicate, test 404. If a duplicate IID was created (i.e., test 404="Yes"), the process returns to the previous step to generate another 64-bit random number, step 402. This process of generating and testing IIDs, steps 402 and 404, continues until a non-duplicate IID is generated.

If the generated IID does not match any existing IIDs on the system (i.e., test 404="No"), the newly created IID is stored in memory or a buffer associated with the interface for which the address was requested, step 406. Next, the process determines if the IID is for use in a broadcast network, test 408. If the interface will not be used for a broadcast medium (i.e., test 408="No"), the IID is made available for generating an address for assignment to an application, step 424, after which the process can return to the routine or process that called it, step 422. In an embodiment, the newly created IID may be used to create an address that is stored in memory or a buffer, step 406.

If the IID is for use in a broadcast network (i.e., test 408="yes"), the process sets the IID state to tentative, step 410, and initiates the DAD process, step 420. The DAD process does not need to be performed for a point-to-point network as the IID of the nodes on either end of the link are typically known—this is the case in 3G networks today. Having initiated DAD, the process can return to the routine or process that called it, step 422. Since the DAD process may determine that the IID (or the address based on the IID) is a duplicate of another IID (or address) on the broadcast node, the results of the DAD process 420 will need to be tested. This testing is described below with reference to FIG. 6. In an embodiment, the process may proceed directly from the DAD process 420 to the DAD completion process illustrated in FIG. 6. In an alternative embodiment, the DAD testing may be included within the IID generation process as describe below with reference to FIG. 9.

It should be noted that in CDMA wireless applications each mobile handset owns its prefix so there is no need to perform the DAD process on addresses. Instead, confirming that an IID does not match another IID used on the mobile handset, step 404, is sufficient to confirm that the address is not redundant. Thus, the embodiment process involving the DAD process and processing of IIDs in a tentative state may not be implemented for a CDMA network interface. This is not to imply that a CDMA mobile handset will not employ the various embodiments since other wireless and wired network connections may also be used by the mobile handset, such as wide-area wireless (WiFi) network connections like WLAN, BlueTooth, WiFi, WiMax, etc.

Figure 5:
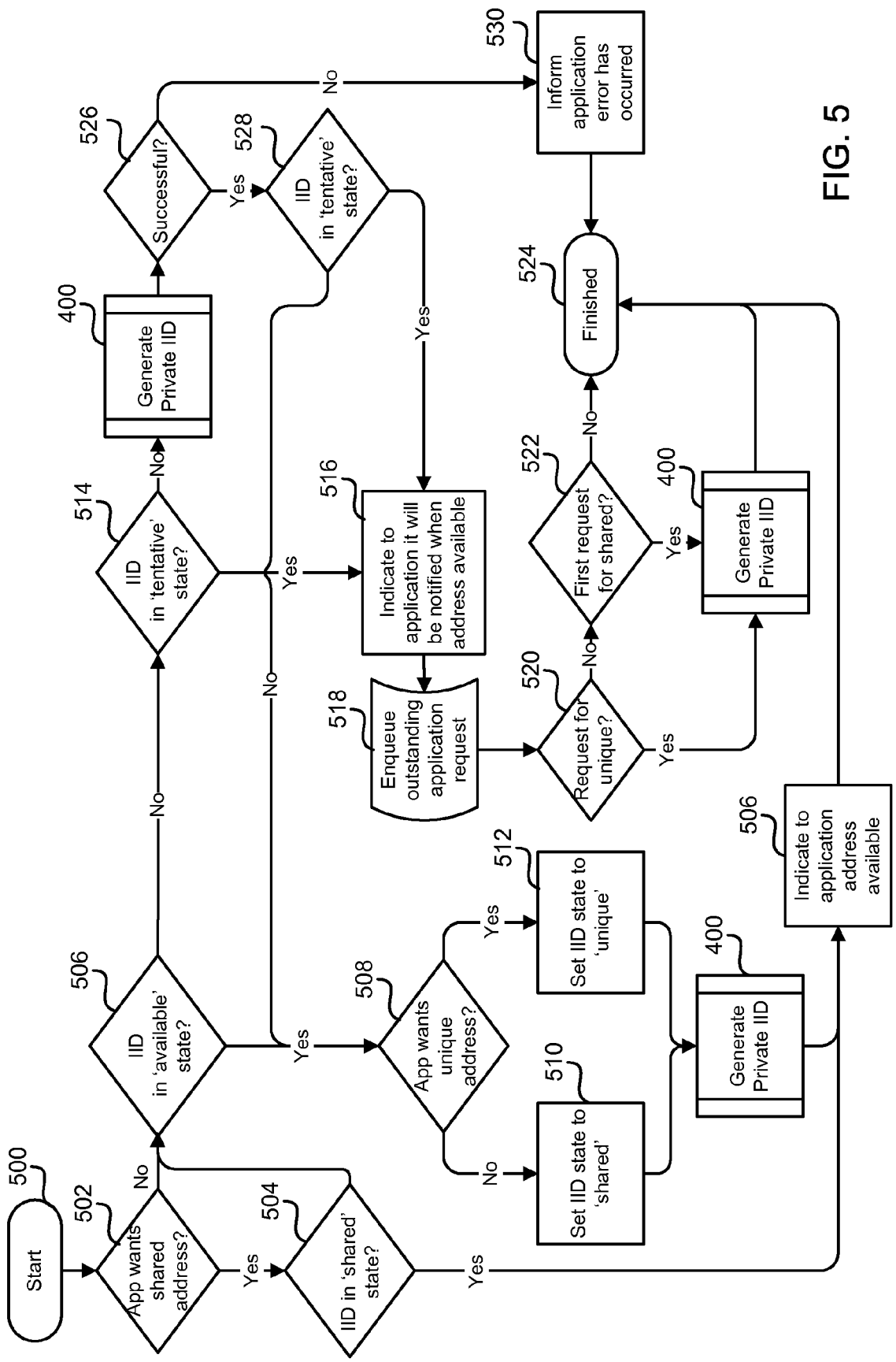
FIG. 5 is a process flow diagram of an embodiment method for allocating a private address triggered by an application request.

When an application requests an address and an IID or address is available, the address (either the address in memory or the combination of the IID and prefix) needs to be allocated to the application. An example embodiment process for accomplishing this address allocation is illustrated in FIG. 5. The process may be initiated as a subroutine or application call, step 500, after which the process determines whether the application requested a shared address, test 502. As discussed above, when the application requests a shared private address, the private address may be used by more than one application. If the application requested a shared address (i.e., test 502="Yes"), the process determines whether the existing address (based on a shared IID) is in a shared state, test 504. As discussed above, an address (or an IID used to generate the address) may be in a shared state if a previous application has already requested and was allocated a shared address. If an IID (or address) is in a shared state and is available (i.e., test 504="Yes"), the application is informed that a shared address is available and is provided the address, step 506. Having fulfilled the application's address request, no new IID needs to be created so the process terminates or returns to the routine that called the process, step 524.

If the application requested a shared address but an address or IID is not in a shared state (i.e., test 504="No"), or if the application requested a unique address (i.e., test 502="No"), the process determines whether the IID or address is in an available state (i.e., an IID or address is available for allocation), test 506. An IID is in an available state if the IID is ready to be used to create an address that can be assigned to an application, as described above for the Available state 306 with reference to FIG. 3. Similarly, an address is in an available state if the address can be assigned to an application. If the IID or address is in an available state (i.e., test 506="Yes"), the process again checks whether the application is requesting a unique or shared address, test 508. If the application is not requesting a shared address (i.e., test 508="No"), the process sets the IID/address state to shared, 510, and initiates the generation of another IID, process 400, as described above with reference to FIG. 4. This new private IID may be stored in a buffer or memory until an address is requested, or used to generate a new private address that is stored in a buffer or memory until requested. The application is then informed that a shared address is available and is provided the IID-based address, step 506. Having fulfilled the application's address request, the process terminates or returns to the routine that called the process, step 524.

If the application is requesting a unique address (i.e., test 508="Yes"), the process sets the IID or address state, step 512, and initiates the generation of another IID, process 400, as described above with reference to FIG. 4. This new private IID may be stored in a buffer or memory until an address is requested, or used to generate a new private address that is stored in a buffer or memory until requested. The application is then informed that a unique address is available and is provided the IID-based address, step 506. Having fulfilled the application's address request, the process terminates or returns to the routine that called the process, step 524.

If the IID or address is not in an available state (i.e., test 506="No"), the process determines if the IID is in a tentative state, test 514. An IID is in a tentative state if the IID is undergoing the DAD process, as described above for the Tentative state 304 with reference to FIG. 3. If the IID is in a tentative state, the process informs the application that it will be notified once the address is available, step 516, and the outstanding application request is placed in a queue until a private IID is available for creating an address, step 518. To determine whether a new private IID should be generated, the process determines whether the application has requested a unique address, test 520. If the application has requested a unique address, the process generates a new private IID, step 400, as described above with reference to FIG. 4. This new private IID may be stored in a buffer or memory until an address is requested, or used to generate a new private address that is stored in a buffer or memory until requested. Since the IID is awaiting the DAD process in the tentative state it cannot yet be used to generate an address to be assigned to the requesting application, so the process terminates or returns to the routine that called the process, step 524. The IID-based address will be assigned to the requesting application when the DAD process completes as described below with reference to FIG. 6.

If the application has not requested a unique address (i.e., test 520="No"), the process determines whether this is the first request for a shared address, test 522. If it is not the first request for a shared address, there is no new IID to be generated or address to be allocated, or the IID is awaiting the DAD process in the tentative state so that it cannot yet be assigned to the requesting application, and therefore the process terminates or returns to the routine that called the process, step 524. An address based on the IID will be assigned to the requesting application when the DAD process completes as described below with reference to FIG. 6.

If this is the first request for a shared address (i.e., test 522="Yes"), then an address needs to be assigned and replaced, so a new private IID is generated, process 400, as described above with reference to FIG. 4. Since the IID is awaiting the DAD process in the tentative state an address based on the IID cannot yet be assigned to the requesting application, so the process terminates or returns to the routine that called the process, step 524. An address based on the IID will be assigned to the requesting application when the DAD process completes as described below with reference to FIG. 6.

Returning to the determination of whether the IID is in a tentative step, test 514, if the IID is not in a tentative state (i.e., test 514="No"), this indicates that no IID has been generated, is available in memory or is undergoing the DAD process. In this case, the process may initiate the generation of another IID, process 400, as described above with reference to FIG. 4. The process may then test whether the IID generation was successful, test 526, and if so, test whether the IID is in a tentative state, test 528. If the IID is in a tentative state at this point (i.e., test 528="Yes") the IID is undergoing the DAD process, so the application is informed that it will be notified when the address is available, step 516. Thereafter, the process continues as described above for steps 518-524. For example, if the request from the application was for a shared broadcast address, the IID generated after test 514 will undergo the DAD process, so test 528 will be "yes," test 520 will be "no" and test 522 will be "yes," since there was no broadcast address available initially. As a result a second private IID will be generated, process 400, before the process terminates or returns to the routine that called the process, step 524.

If after a successful generation of a private IID it is determined that the IID is not in a tentative state (i.e., test 528="No"), this indicates that the application requested a non-broadcast address (because the DAD process was not initiated). In this situation, the process continues by determining if the application requested a unique address, test 508. Thereafter, the process continues as described above for steps 508-510-400-506 or 508-512-400-506.

If it is determined that the generation of a private IID (process 400 after test 514) was not successful (i.e., test 526="No"), this indicates that an error condition exists which, for some reason, precluded generation of a non-redundant IID. In this situation there is no point in continuing to process the request for an address, so the application is informed that an error has occurred, step 530, and the process terminates or returns to the routine that called the process, step 524.

Figure 6:
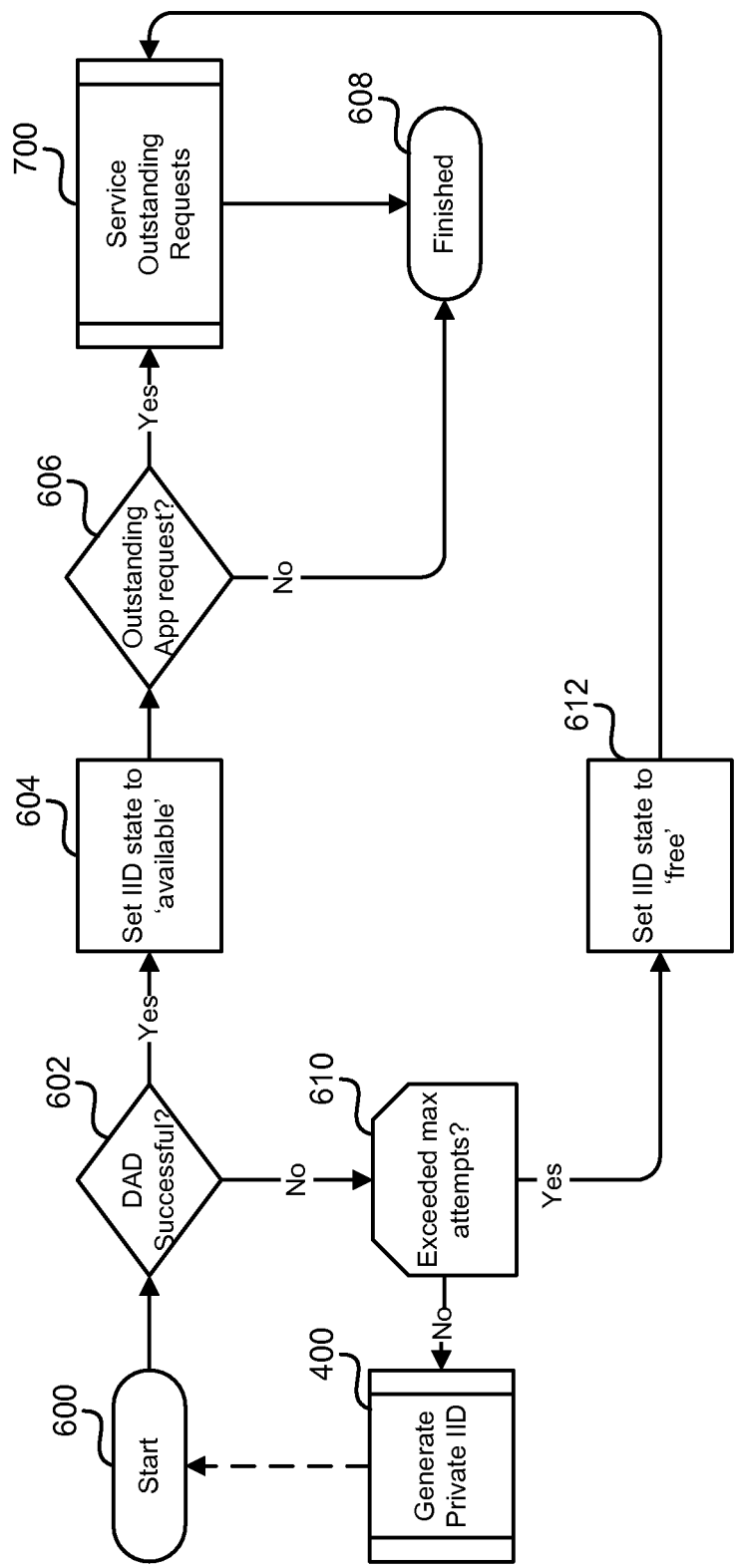
FIG. 6 is a process flow diagram of an embodiment method for managing private IIDs during a Duplicate Address Detection process.

An example embodiment process for managing private IIDs and addresses during the DAD process is illustrated in FIG. 6. The process is initiated, step 600, upon the completion of the DAD process initiated in the IID generation process described above with reference to FIG. 4 (see step 420). The process first determines if the DAD process was successful, test 602. If the DAD process is successful, then there are no matching addresses on the system so the IID can be used to generate non-redundant broadcast address, and the process sets the IID state to "Available," step 604. With the IID in the available state the IID can be used to generate an address for assignment to an application, so the process determines if any application address requests are outstanding, test 606. If there are outstanding application address requests (i.e., test 606="Yes"), the process services the outstanding address requests, step 700, initiating the processes described below with reference to FIG. 7. Once those processes are complete (i.e., one or more the applications have been assigned the IID) the process terminates or returns to the routine that called the process, step 608. However, if no application address requests are outstanding (i.e., test 606="No"), the process terminates or returns to the routine that called the process, step 608.

If the process determines that the DAD process was not successful (i.e., test 602="No"), the process may check to see if the DAD process allows for multiple attempts to confirm different IIDs in the event of an IID is found to be redundant, test 610. If the process does allow for multiple attempts and the maximum attempts have not been exceeded (i.e., test 610="No"), the process proceeds to initiate the generation of a new private ID, process 400, as described above with reference to FIG. 4. Since an application has requested a broadcast address (which caused the DAD process to be initiated), the process of generating a new IID, process 400, will also initiate the DAD process (see step 420 in FIG. 4), and that process will return to the beginning of the process illustrated in FIG. 6, step 600, as indicated by the dashed line.

If the process does not allow for a maximum number of attempts or if the maximum number of attempts has been exceeded (i.e., test 610="Yes"), the process sets the IID state to "Free" to indicate that no IID is available, step 612, and services the outstanding address requests, step 700, initiating the processes described below with reference to FIG. 7. Once those processes are complete (i.e., one or more the applications have been assigned the IID) the process terminates or returns to the routine that called the process, step 608.

Figure 7:
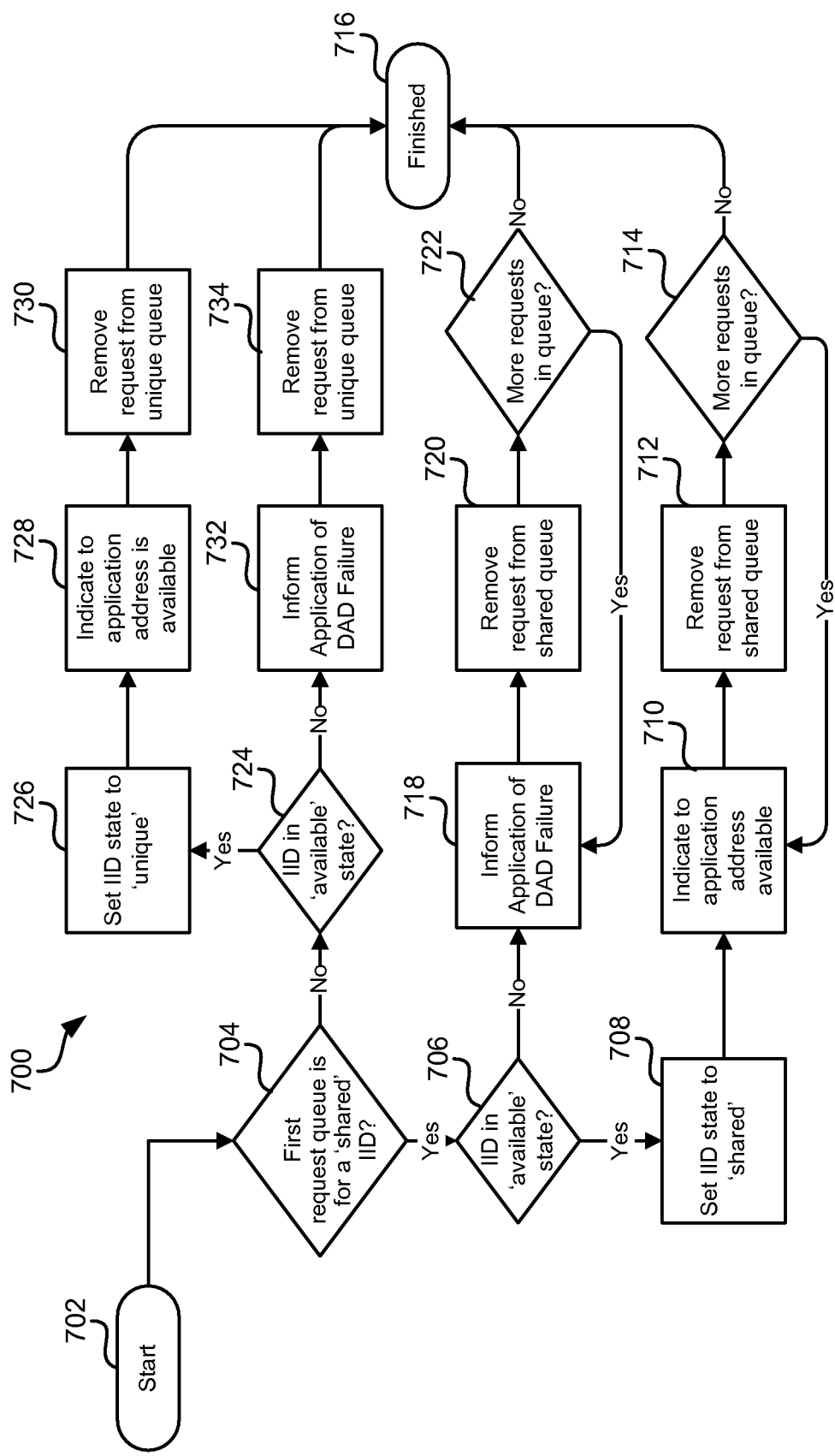
FIG. 7 is a process flow diagram of an embodiment method for servicing outstanding application requests.

An example embodiment process for servicing outstanding application address requests, process 700, is illustrated in FIG. 7. Process 700 may be activated, step 702, by the system in response to an address request from an application when an IID is the available state or by completion of the DAD completion handling processes described above with reference to FIG. 6. The process first determines whether the request is for a shared address, test 704. If the request is for a shared address, the process determines whether an IID is in an available state, test 706, and if it is, the process sets the IID or address state to shared, step 708. The process then indicates to the application that the address is available, step 710, and removes the request from the shared queue, step 712. The process further determines if there are any more requests are in the shared queue, test 714, and if not the process terminates or returns to the routine or process that called the process, step 716. If more address requests are in the shared queue (i.e., test 714="Yes"), the process returns to step 710 to indicate to the application with the next request in the shared queue that the shared address is available, after which the request is removed from the shared queue, step 712, and the process determines again whether there are any more requests are in the shared queue, 714.

If the IID is not in an available state (i.e., test 706="No"), the process informs the application that a DAD process failure has occurred, step 718, and as a result there will be a further delay in providing an address. The address request is then removed from the shared queue, step 712. The process further determines if there are any more requests in the shared queue, test 722, and if not, the process terminates or returns to the routine that called the process, step 716. However, if there are more requests in the shared queue (i.e., test 722="Yes"), the process returns to step 718 to indicate the DAD failure and address delay to the next application in the shared queue, after which the request is removed from the shared queue, step 720, and the process determines again whether there are any more requests in the shared queue, 722.

If the request is not for a shared address and thus is for a unique address (i.e., test 722="No"), the process determines whether an IID (or address) is in an available state, test 724. If an IID is in an available state, the process sets the IID (or address) state to unique, step 726, indicates to the application that the address is available, step 728, and removes the request from the unique queue, step 730. The process then terminates or returns to the routine that called the process, step 716.

If an IID or address is not in an available state in test 724 (i.e., test 724="No"), the process informs the application that a DAD process failure has occurred, step 732, and as a result an address may not be provided. The address request is then removed from the shared queue, step 734, and the process terminates or returns to the routine or process that called the process, step 716. It is noted that this condition can be reached if the DAD process was unsuccessful (i.e., test 602 in FIG. 6="No") and the maximum number of retries at generating an IID is exceeded (i.e., test 610 in FIG. 6="Yes").

In the address allocation process embodiment described above and illustrated in FIG. 7, addresses are allocated to applications in the order the requests were received. Thus, as each new address is generated it is allocated to the first application remaining in the queue (first-in; first-out).

Figure 8:
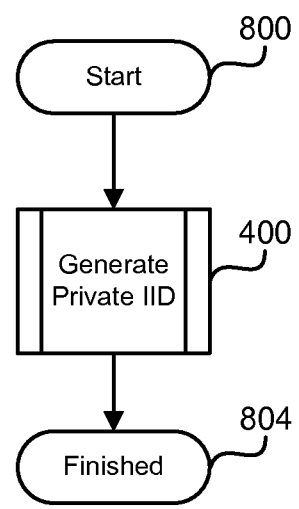
FIG. 8 is a process flow diagram of an embodiment method for generating a private IID upon session establishment.

In order to ensure there is no delay when an address is requested the first time, the system can generate a private IID or address upon session establishment before there is a pending request from an application as illustrated in FIG. 8. This process begins when a session is established, step 800. For example, this process may be initiated when the device receives a router advertisement (RA) which provides the prefix to be used in combination with an IIP to create IP addresses. The process proceeds to generate a private IID using the IID generation process 400 which is described above with reference to FIG. 4. The process creates a private IID in the available state (see step 424 shown in FIG. 4) indicating the address is ready to be assigned to an application upon request. This private IID may be stored in a buffer or memory until an address is requested, or used to generate a new private address that is stored in a buffer or memory until requested. This process may be repeated for each interface. For broadcast interfaces, the IID will under go the DAD process (see step 420 shown in FIG. 4). Once a private IID or address is created, the process terminates or returns to the routine or process that called the process, step 804.

Figure 9:
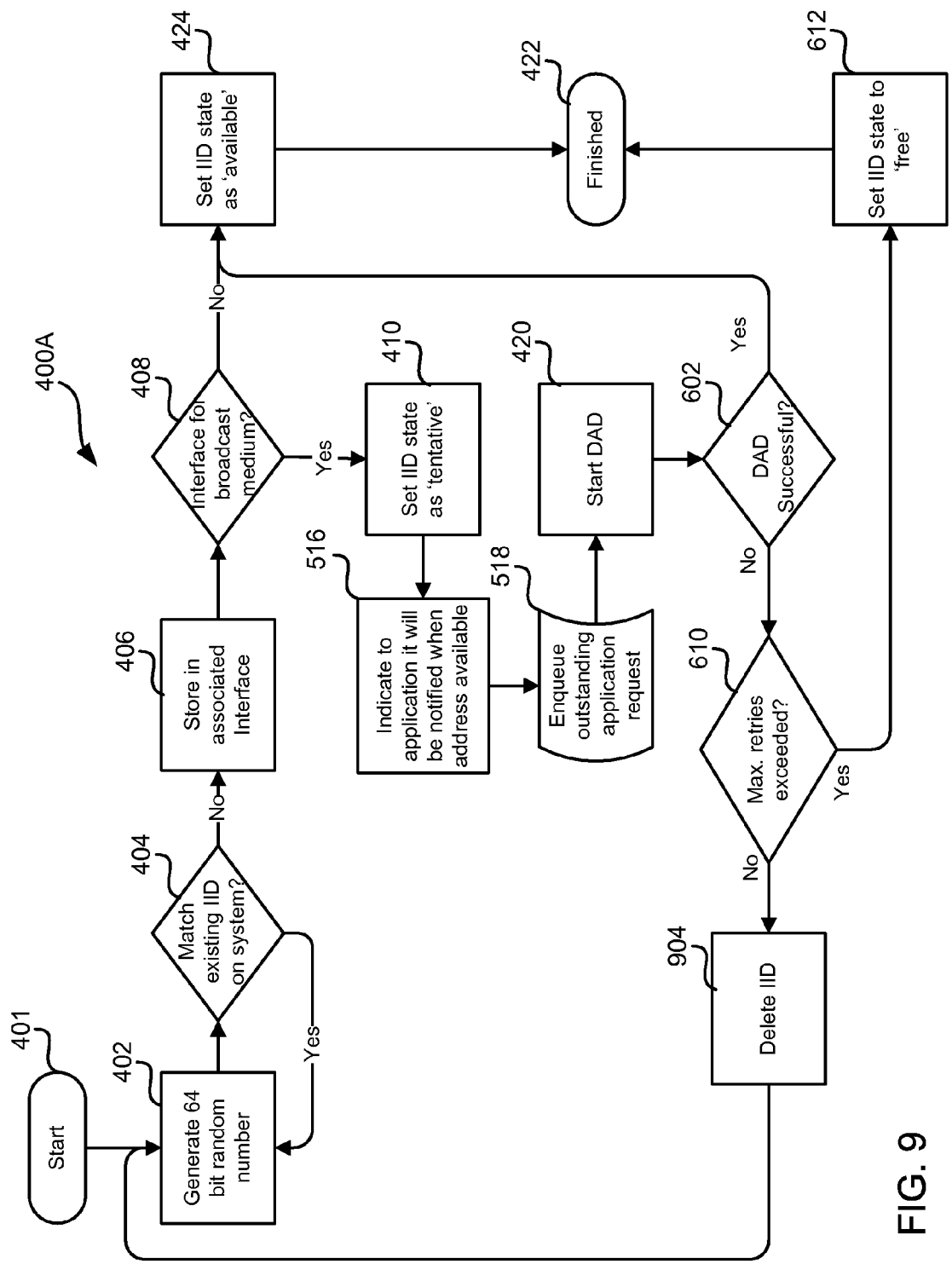
FIG. 9 is a process flow diagram for an alternative embodiment method for generating a private IID.

The forgoing embodiment processes are provided as examples of possible implementations of the present invention, and variations of the processes are within the scope of the claims. For example, the process for managing private IIDs and addresses during and following DAD may be incorporated within the process for generating IIDs 400, such as illustrated in FIG. 9. This combined IID generation process 400A includes the same steps as described above with reference to FIG. 4 (the description of FIG. 4 is incorporated here by reference for like steps shown in FIG. 9) and adds steps shown in FIGS. 5 and 6. In particular, upon determining that the address is for a broadcast medium, test 408, the process sets the IID state to tentative, step 410, indicates to the application that it will be notified when the address is available, step 516, places the address request in a queue, step 518, and initiates the DAD process, step 412. When the DAD process 412 completes, the process may determine whether DAD was successful (i.e., the IID is not redundant), test 602. If DAD was successful, the IID state is set to available, step 424, and the process returns to the routine that called it, step 422.

If the DAD process was not successful (i.e., test 602="No"), the process may check to see if the DAD process allows for multiple attempts to confirm different IIDs in the event of an IID is found to be redundant, test 610. If the process does allow for multiple attempts and the maximum number of attempts has not been exceeded (i.e., test 610="No"), the duplicate IID may be deleted, step 904, after which the process returns to step 402 to generate another 64-bit random number. This loop may continue until either the DAD process is successful (i.e., test 602="Yes") or the maximum number of retries at generating a useable IID is exceeded (i.e., test 610="Yes").

If the process does not allow for a maximum number of retry attempts or if the maximum number of attempts has been exceeded (i.e., test 610="Yes"), the process sets the IID state to "Free" to indicate that no IID or address is available, step 612, and the process returns to the routine that called it, step 422.

Figure 10:
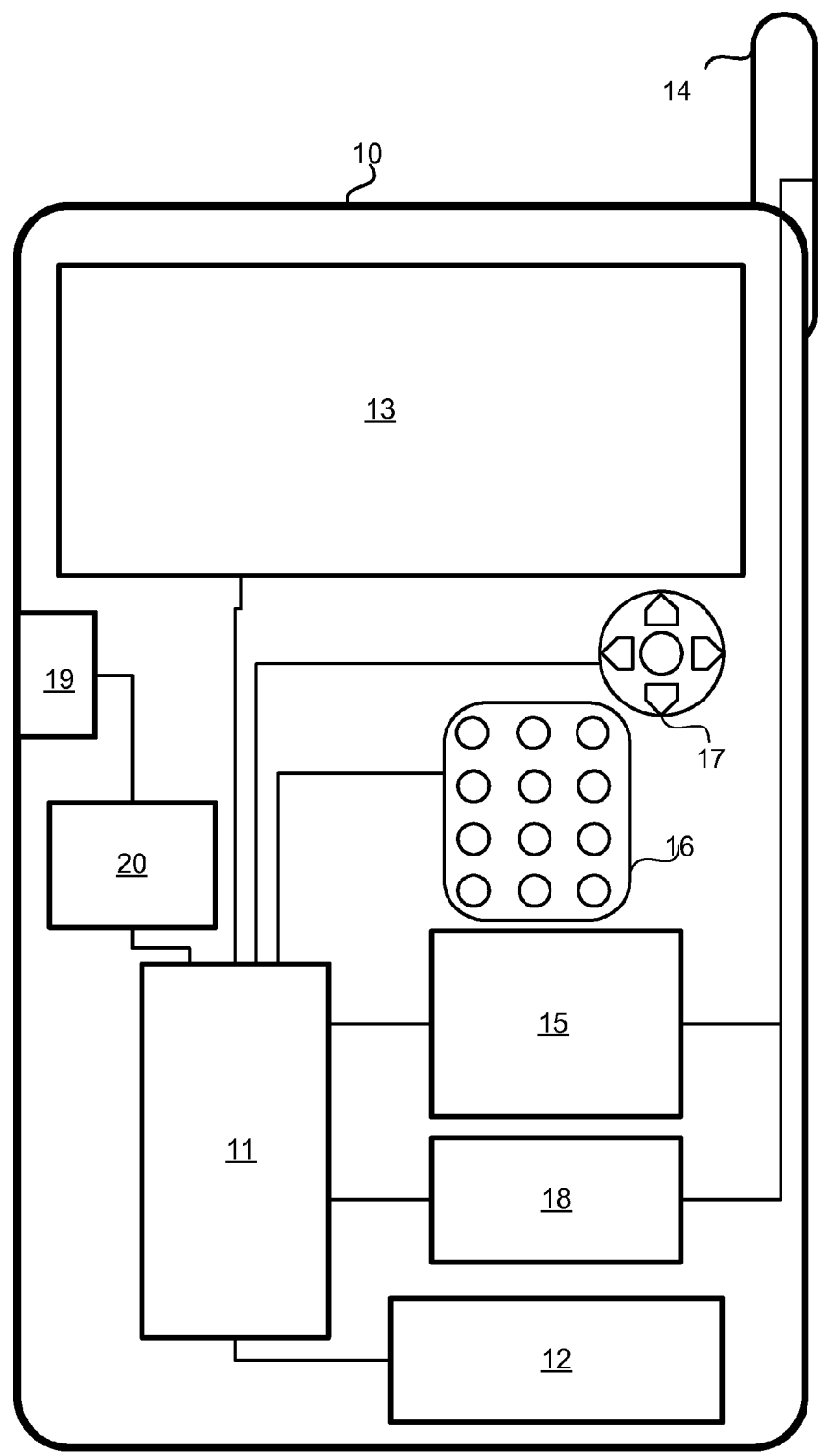
FIG. 10 is a component block diagram of a mobile handset suitable for implementing the various embodiments.

The various embodiments described above may be implemented in a mobile handset configured with circuitry and software for connecting to a variety of wired and wireless networks through wired and wireless interfaces. FIG. 10 provides a block diagram of an example embodiment of such a mobile handset 10 which may be any of a cellular telephone, multimedia Internet enabled cellular telephone, personal digital assistant, electronic music file (e.g., MP3) player, and/or wireless electronic mail receiver. Such a mobile handset 10 may include a processor 11 coupled to memory 12 and a display 13. The mobile handset 10 may also include a number of data input/output interfaces, such as for example, a cellular telephone data receiver, a wired (e.g., FireWire) data link, a Bluetooth wireless data link, and infrared data link (not shown). For example, the mobile handset 10 may include an antenna 14 for receiving the electromagnetic signals from a wireless network transmitter/receiver node (not shown), and a wireless transceiver 15 connected to the antenna 14 for receiving the wireless signal and converting the signals into digital data that is relayed to the processor 11. Similarly, a Bluetooth or similar local wireless data link may include the antenna 14 (or another antenna not shown separately) connected to a WiFi, Bluetooth, WLAN, WiMax, etc. transceiver 18 which converts the received wireless signal into digital data that is relayed to the processor 11. Data may also be transmitted to and from the mobile handset 10 by means of a wired data link, such as a FireWire, USB, serial (e.g., RS-232), or Ethernet data link. For example, data may be transmitted by way of a FireWire data connector 19 coupled to a FireWire modem circuit 20 which converts data received from the connector 19 into digital data that is relayed to the processor 11. As is well known in the art, other wired data links would involve similar circuitry as suitable to the particular data link. Mobile handsets also typically include a key pad 16 and menu selection buttons or rocker switches 17 for receiving user inputs.

Each of the cellular telephone data receiver 15, wired data link 19, 20, wireless data link 18, and IR data link (not shown) are interfaces for which applications may request the processor to provide shared or unique addresses. Additionally, other interfaces may be implemented within the mobile handset 10 for transferring data between other modules and co-processors. Thus, in order to establish a data connection using a private address, an application must obtain an address from the interface and bind one of its sockets to the address.

Private addresses may be generated by the processor 11 executing one or more of the embodiment methods described above, such as by executing software instructions configured to implement one or more of the methods. Such software instructions may be stored in memory 12 as an API, as part of the device's operating system or as compiled software implementing an embodiment method.

The processor 11 may be a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The various embodiments described above enable a device, such as a mobile handset 10, to generate private addresses without impacting the performance of the device that would otherwise be required if an IID were generated in response to an address request. The various embodiments are particularly advantageous in the context of cellular telephone devices which have increased privacy concerns and operate with frequent network connections. By avoiding link establishment delays associated with generating private addresses, the various embodiments can improve a users' experience.

The hardware used to implement the events of forgoing embodiments may be processing elements and memory elements configured to execute a set of instructions, wherein the set of instructions are for performing method steps corresponding to the above events. Alternatively, some events may be performed by circuitry that is specific to a given function.

Those of skill in the art would appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The steps of a method or algorithm described in connection with the embodiments disclosed herein may be embodied directly in hardware, in a software module executed by a processor, or in a combination of the two. A software module may reside in processor readable memory 12 which may be any of RAM memory, flash memory, ROM memory, EPROM memory, EEPROM memory, registers, hard disk, a removable disk, a CD-ROM, or any other form of storage medium known in the art. An exemplary storage medium 11 is coupled to a processor 11 such that the processor 11 can read information from, and write information to, the storage medium 12. In the alternative, the storage medium may be integral to the processor 11. The processor 11 and the storage medium 11 may reside in an ASIC. The ASIC may reside in a user terminal. In the alternative, the processor 11 and the storage medium 12 may reside as discrete components in a user terminal.

The foregoing description of the various embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein, and instead the claims should be accorded the widest scope consistent with the principles and novel features disclosed herein.

We claim:

1. A method for allocating a privacy address to an application in a mobile handset, wherein the privacy address is an Internet Protocol version 6 (IPv6) privacy address produced by generating a random Interface ID (private IID) and associating the private IID with a network prefix of a current access router, comprising:
    pre-generating a first privacy address;
    performing a duplicate address determination on the first privacy address;
    storing the first privacy address in memory of the mobile handset;
    receiving a request for an address from the application;
    recalling the first privacy address from memory of the mobile handset;
    allocating the first privacy address to the application;
    generating a second privacy address promptly in response to allocation of the first privacy address and prior to receipt of a request for an address by another application;
    performing a duplicate address determination on the second privacy address; and
    storing the second privacy address in memory of the mobile handset.

2. The method for allocating a privacy address to an application of claim 1, further comprising:
    determining if the application is requesting a unique address; and
    allocating the first privacy address solely to the application if the application is requesting a unique address.

3. The method for allocating a privacy address to an application of claim 1, further comprising:
    determining if the application is requesting a shared address;
    allocating the first privacy address to the application while retaining the first privacy address in memory for allocation to other applications requesting a shared address if the application is requesting a shared address;
    starting a deprecation timer when the requesting application binds to the first privacy address; and
    deleting the first privacy address from memory of the mobile handset when the depreciation timer expires.

4. The method for allocating a privacy address to an application of claim 1, further comprising:
    determining if the application is requesting a shared address;
    allocating the first privacy address to the application while retaining the first privacy address in memory for allocation to other applications requesting a shared address if the application is requesting a shared address;
    starting a deprecation timer when the requesting application binds to the first privacy address;
    maintaining a reference count on the first privacy address indicating a number of applications bound to the first privacy address; and
    deleting the first privacy address from memory of the mobile handset when (1) the deprecation timer expires and (2) the reference count equals zero.

5. The method for allocating a privacy address to an application of claim 1, further comprising:
    deleting the first privacy address from memory of the mobile handset if the application does not bind to the first privacy address within a preset period of time; and
    informing the application that the first privacy address is deleted.

6. A mobile handset, comprising:
a processor;
at least one network interface coupled to the processor; and
a memory coupled to processor, the memory having stored therein processor executable software instructions configured to cause the processor to perform steps comprising:
   pre-generating a first privacy address;
   performing a duplicate address determination on the first privacy address;
   storing the first privacy address in the memory;
   receiving a request for an address from an application;
   recalling the first privacy address from the memory;
   allocating the first privacy address to the application;
   generating a second privacy address promptly in response to allocation of the first privacy address and prior to receipt of a request for an address by another application;
   performing a duplicate address determination on the second privacy address; and
   storing the second privacy address in the memory, wherein each privacy address is an Internet Protocol version 6 (IPv6) privacy address produced by generating a random Interface ID (private IID) and associating the private IID with a network prefix of a current access router.

7. The mobile handset of claim 6, wherein the processor executable software instructions stored in the memory are configured to cause the processor to perform steps further comprising:
   determining if the application is requesting a unique address; and
   allocating the first privacy address solely to the application if the application is requesting a unique address.

8. The mobile handset of claim 6, wherein the processor executable software instructions stored in the memory are configured to cause the processor to perform steps further comprising:
   determining if the application is requesting a shared address;
   allocating the first privacy address to the application while retaining the first privacy address in memory for allocation to other applications requesting a shared address if the application is requesting a shared address;
   starting a deprecation timer when the requesting application binds to the first privacy address; and
   deleting the first privacy address from memory of the mobile handset when the deprecation timer expires.

9. The mobile handset of claim 6, wherein the processor executable software instructions stored in the memory are configured to cause the processor to perform steps further comprising:
   determining if the application is requesting a shared address;
   allocating the first privacy address to the application while retaining the first privacy address in memory for allocation to other applications requesting a shared address if the application is requesting a shared address;
   starting a deprecation timer when the requesting application binds to the first privacy address;
   maintaining a reference count on the first privacy address indicating a number of applications bound to the first privacy address; and
   deleting the first privacy address from memory of the mobile handset when (1) the deprecation timer expires and (2) the reference count equals zero.

10. The mobile handset of claim 6, wherein the processor executable software instructions stored in the memory are configured to cause the processor to perform steps further comprising:
    deleting the first privacy address from memory of the mobile handset if the application does not bind to the first privacy address within a preset period of time; and
    informing the application that the first privacy address is deleted.

11. A mobile handset, comprising:
    means for pre-generating a first privacy address;
    means for performing a duplicate address determination on the first privacy address;
    means for storing the first privacy address in a memory;
    means for receiving a request for an address from an application;
    means for recalling the first privacy address from the memory;
    means for allocating the first privacy address to the application;
    means for generating a second privacy address promptly in response to allocation of the first privacy address and prior to receipt of a request for an address by another application;
    means for performing a duplicate address determination on the second privacy address; and
    means for storing the second privacy address in the memory, wherein each privacy address is an Internet Protocol version 6 (IPv6) privacy address produced by generating a random Interface ID (private IID) and associating the private IID with a network prefix of a current access router.

12. The mobile handset of claim 11, further comprising:
    means for determining if the application is requesting a unique address; and
    means for allocating the first privacy address solely to the application if the application is requesting a unique address.

13. The mobile handset of claim 11, further comprising:
    means for determining if the application is requesting a shared address;
    means for allocating the first privacy address to the application while retaining the first privacy address in memory for allocation to other applications requesting a shared address if the application is requesting a shared address;
    means for starting a deprecation timer when the requesting application binds to the first privacy address; and
    means for deleting the first privacy address from memory of the mobile handset when the deprecation timer expires.

14. The mobile handset of claim 11, further comprising:
    means for determining if the application is requesting a shared address;
    means for allocating the first privacy address to the application while retaining the first privacy address in memory for allocation to other applications requesting a shared address if the application is requesting a shared address;
    means for starting a deprecation timer when the requesting application binds to the first privacy address;
    means for maintaining a reference count on the first privacy address indicating a number of applications bound to the first privacy address; and
    means for deleting the first privacy address from memory of the mobile handset when (1) the deprecation timer expires and (2) the reference count equals zero.

15. The mobile handset of claim 11, further comprising:

means for deleting the first privacy address from memory of the mobile handset if the application does not bind to the first privacy address within a preset period of time; and means for informing the application that the first privacy address is deleted.

16. A non-transitory processor readable storage medium having stored thereon processor executable instructions configured to cause a processor of a mobile handset to perform steps comprising:

pre-generating a first privacy address;

performing a duplicate address determination on the first privacy address;

storing the first privacy address in memory of the mobile handset;

receiving a request for an address from an application;

recalling the first privacy address from the memory of the mobile handset;

allocating the first privacy address to an application;

generating a second privacy address promptly in response to allocation of the first privacy address and prior to receipt of a request for an address by another application;

performing a duplicate address determination on the second privacy address; and storing the second privacy address in the memory of the mobile handset, wherein each privacy address is an Internet Protocol version 6 (IPv6) privacy address produced by generating a random Interface ID (private IID) and associating the private IID with a network prefix of a current access router.

17. The non-transitory processor readable storage medium of claim 16, wherein the stored processor executable software instructions are configured to cause the processor to perform steps further comprising:

determining if the application is requesting a unique address; and allocating the first privacy address solely to the application if the application is requesting a unique address.

18. The non-transitory processor readable storage medium of claim 16, wherein the stored processor executable software instructions are configured to cause the processor to perform steps further comprising:

determining if the application is requesting a shared address;

allocating the first privacy address to the application while retaining the first privacy address in memory for allocation to other applications requesting a shared address if the application is requesting a shared address;

starting a deprecation timer when the requesting application binds to the first privacy address; and deleting the first privacy address from memory of the mobile handset when the depreciation timer expires.

19. The non-transitory processor readable storage medium of claim 16, wherein the stored processor executable software instructions are configured to cause the processor to perform steps further comprising:

determining if the application is requesting a shared address;

allocating the first privacy address to the application while retaining the first privacy address in memory for allocation to other applications requesting a shared address if the application is requesting a shared address;

starting a deprecation timer when the requesting application binds to the first privacy address;

maintaining a reference count on the first privacy address indicating a number of applications bound to the first privacy address; and deleting the first privacy address from memory of the mobile handset when (1) the deprecation timer expires and (2) the reference count equals zero.

20. The non-transitory processor readable tangible non transitory storage medium of claim 16, wherein the stored processor executable software instructions are configured to cause the processor to perform steps further comprising:

deleting the first privacy address from memory of the mobile handset if the application does not bind to the first privacy address within a preset period of time; and informing the application that the first privacy address is deleted.

* * * * *